United States Patent
Mihalos et al.

(10) Patent No.: US 7,029,714 B2
(45) Date of Patent: Apr. 18, 2006

(54) COLD FORMED FOOD BARS CONTAINING FRAGILE BAKED INCLUSIONS

(75) Inventors: Mihaelos N. Mihalos, Palisades Park, NJ (US); Jessica Schwartzberg, Maplewood, NJ (US)

(73) Assignee: Kraft Food Holdings, INC, Northfield, IL (US)

( * ) Notice: Subject to any disclaimer, the term of this patent is extended or adjusted under 35 U.S.C. 154(b) by 408 days.

(21) Appl. No.: 10/091,160

(22) Filed: Mar. 5, 2002

(65) Prior Publication Data

US 2003/0170348 A1    Sep. 11, 2003

(51) Int. Cl.
*A21D 13/00* (2006.01)

(52) U.S. Cl. .................... 426/89; 426/103; 426/285; 426/660

(58) Field of Classification Search .................. 426/49, 426/94, 103, 285, 660
See application file for complete search history.

(56) References Cited

U.S. PATENT DOCUMENTS 6,592,915 B1 *   7/2003   Froseth et al. ................ 426/93
6,676,982 B1 *   1/2004   Mody .......................... 426/93

OTHER PUBLICATIONS

Sherry Lewis, Excellent no Bake Cookie/Candy Collection, 2001.*
Bakery Fats, American Soybean Association, 1997, pp. 2, 17-20, 28-31, 49, 50.

* cited by examiner

*Primary Examiner*—Lien Tran
(74) *Attorney, Agent, or Firm*—Thaddius J. Carvis; Thomas A. Marcoux

(57) ABSTRACT

Relatively large (for example: ¼ inch × ¼ inch), fragile particles of a baked cookie product are a significant ingredient in a cold formed food bar product. The food bar product, which in addition to cookie pieces comprises sugar and filler fat, and optional ingredients such as puffed wheat, puffed rice and nuts, is formed by rolling the mixed ingredients into a slab, slicing the slab into ropes, cutting the ropes into conveniently sized pieces and finally enrobing with a chocolate or chocolate compound.

10 Claims, 2 Drawing Sheets

COLD FORMED FOOD BARS CONTAINING FRAGILE BAKED INCLUSIONS

TECHNICAL FIELD

This invention relates to cold formed food bars which contain relatively large pieces of fragile baked pieces, such as pieces of a baked cookie product. Other ingredients include sugar, cookie fines, fats and, optionally, inclusions such as nuts and/or particles such as puffed rice, or puffed wheat. After forming, the bars may be enrobed in a coating such as chocolate or chocolate compound.

BACKGROUND OF THE INVENTION

In recent years, various types of food bars containing mixtures of ingredients held together with a suitable binder have become popular as snacks, healthy treats or quick energy foods. For example, Michnowski, U.S. Pat. No. 4,859,475, discloses a snack bar composed of ingredients including corn syrup, rice cereal, soy protein and peanut butter which may be coated with a chocolate compound coating. Michnowski mixed liquid components, added minor dry ingredients, mixed again, and then added major dry ingredients, mixed to homogeneity and extruded into rectangular dies at room temperature, cut into individual serving sizes and coated prior to packaging in film.

Granola bars are another popular type of cold formed food bar consisting of dry materials held together by a binder. Granola bars typically consists of a major portion of granola, i.e., rolled oats and/or wheat, and minor amounts of fruit and/or nuts. These bars are commonly held together or cemented by a baked cookie-type matrix comprising crumbs of the cereal product saturated with sugar and vegetable oils. Similar bars replace a part of all of the granola with other processed cereals such as puffed wheat or rice. Such bars are typically dry and friable in texture. Such fat-occluded food compositions are disclosed in Kelly et al. U.S. Pat. No. 4,055,669.

Other handheld snack bars have crust portions and smooth creamy fillings. See, for example, Dally et al., U.S. Pat. No. 6,299,916.

Handheld food bars such as the above described products fill a consumer demand for on-the-go snacks, be they nutritious or indulgent or both. Such products are typically so-called "single serve" products, meaning that the products are individually wrapped as a packaged good, and one such product constitutes one serving portion.

Cookie bits have been suggested for inclusion in various food items, such as chocolate bars and ice cream, with the bits being employed as a substitute for more common inclusions such as fruits and nuts. See Crothers, U.S. Pat. No. 5,147,669. Crothers, however, utilized relatively small amounts of such inclusions, from 8%–10% by weight based on the total weight of the foodstuff containing the inclusions, and the inclusions utilized by Crothers were not fragile pieces, the breakage of which was controlled.

SUMMARY OF THE INVENTION

It is an object of the present invention to provide a process for forming a food bar product containing relatively large proportions of relatively large baked inclusions.

It is a further object of the invention to provide a process for forming an indulgent food bar product containing a relatively large proportion of relatively large baked cookie pieces.

It is a further object of the invention to provide a process for forming an indulgent food bar product containing a substantial number of baked cookie pieces which will not pass through a screen with a mesh size of at least about 0.157 inches.

It is a further object of the invention to provide an indulgent food bar product containing relatively large fragile pieces of a baked cookie product, giving the product a friable, crunchy texture.

These and other objects are accomplished by the invention, which provides a process for cold forming a food bar product containing pieces of baked cookies, sugar and fat.

DETAILED DESCRIPTION OF THE INVENTION

Figure 1:
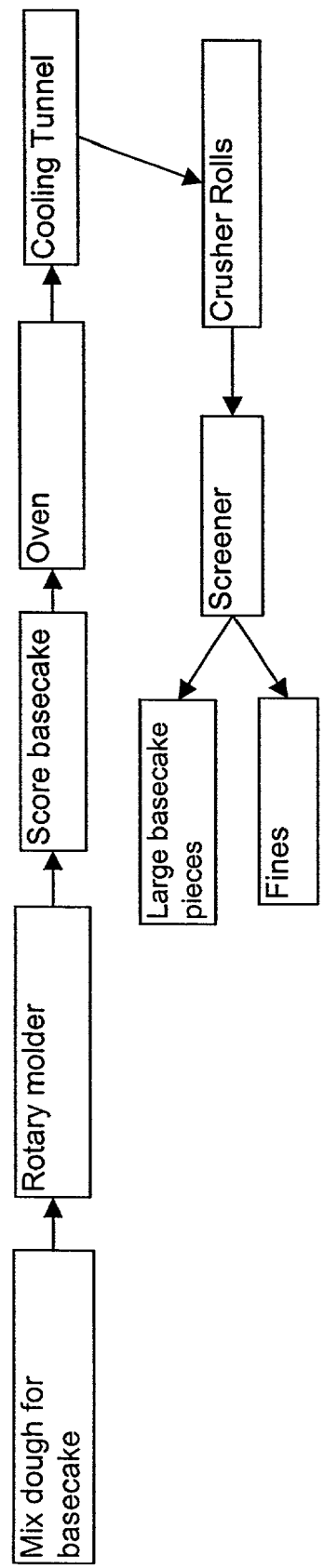
FIG. 1 is a flow diagram illustrating the method of the invention for forming pieces of basecake.
Figure 2:
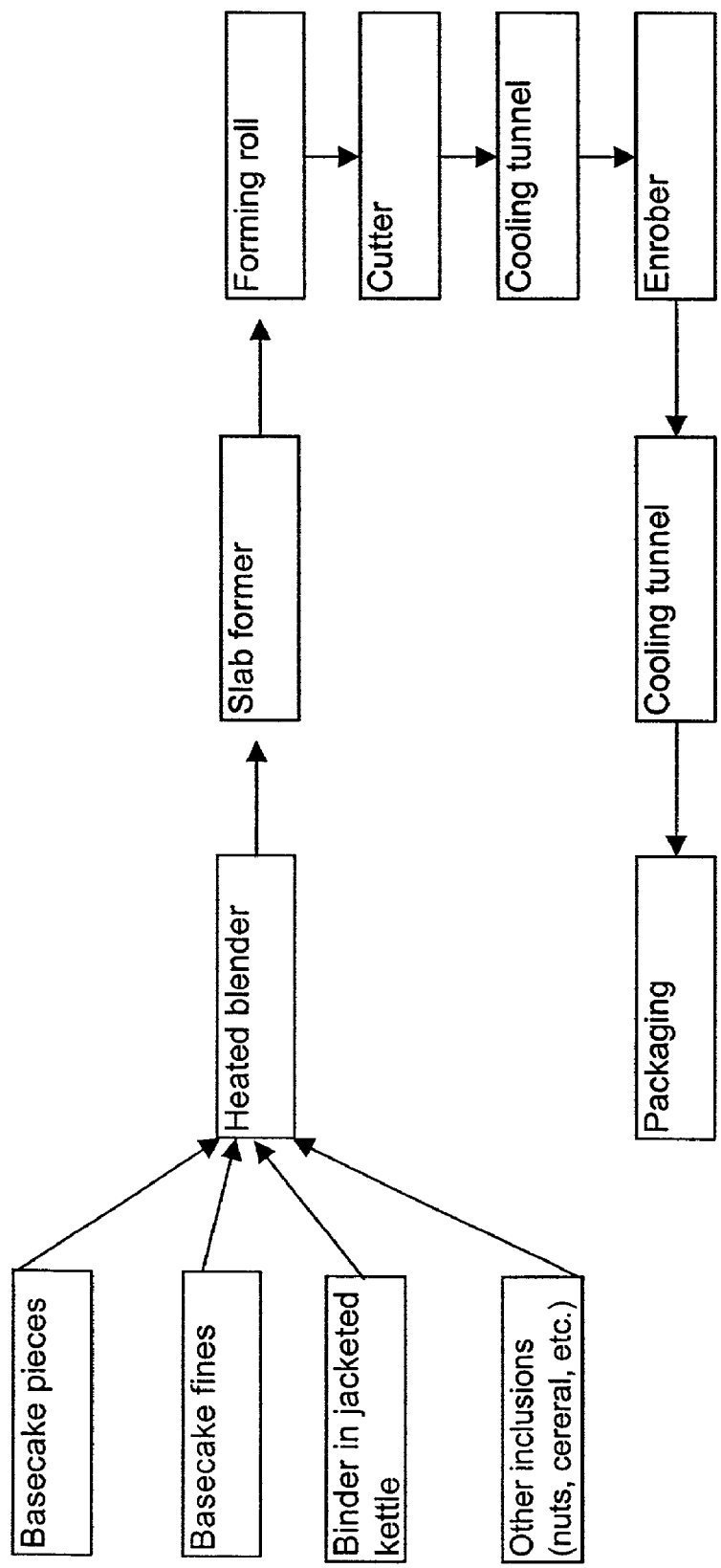
FIG. 2 is a flow diagram illustrating the method of the present invention for making cold formed, enrobed food bars containing large, fragile baked pieces.

In one embodiment, the invention is directed to a method for cold forming food bars containing large fragile particles of a baked cookie product comprising:

(1) breaking a cookie basecake into pieces of a preselected size;

(2) mixing the basecake pieces in a mixer with ingredients comprising sugar, filler fat, and coating fat, wherein the sugar is present in an amount ranging from 25%–70% by weight of the cookie basecake, the filler fat is present in an amount ranging from 15% –35% by weight of the cookie basecake, and the coating fat is present in an amount ranging from about 5% –20% by weight of the cookie basecake;

(3) maintaining the temperature of the mixer at a temperature sufficient to ensure that the fat ingredients do not stick to the surface of the mixer;

(4) mixing the ingredients at a speed such that a majority of the cookie basecake particles of the preselected size will remain intact;

(5) feeding the mixed ingredients into a hopper and subsequently forming the mixed ingredients into a slab using a series of heated compression rolls, which rolls press the mixed ingredients into a progressively thinner slab, and wherein the heat of the rolls is sufficient to prevent adhesion of the fat ingredients on the rolls;

(6) laying the compressed slab of ingredients onto a conveyor belt which feeds the slab through heated slitter knives or a heated grooved roll positioned to slice the slab or form into ropes of a desired width and height;

(7) separating the ropes on a conveyor;

(8) cutting the ropes into a desired product length;

(9) cooling the product to ambient temperature, enrobing the individual pieces in chocolate or another coating compound; and

(10) packaging the enrobed product in containers suitable for retail sale.

In another embodiment, the invention is directed to a method for cold forming enrobed food bars containing large fragile particles of a baked cookie product comprising:

(1) breaking a cookie basecake into pieces at least 85% by weight of which are of a size which will not pass through a screen with a mesh size of 0.157 inches;

(2) mixing cookie basecake, consisting of the said basecake pieces along with basecake fines in an amount such that the cookie basecake pieces plus fines will account for 48%–56% by weight of the cold formed bar prior to enrobing, and wherein said cookie basecake consists of 10%–15% by weight of fines, in a mixer with ingredients comprising a preblended mixture of sugar, a filler fat, and a coating fat, and optional inclusions such as cereal pieces, nuts or other compatible inclusions, wherein the added sugar is present in an amount ranging from 25% –70% by weight of the cookie basecake, the filler fat is present in an amount ranging from 15% –35% by weight of the cookie basecake, and the coating fat is present in an amount ranging from about 5% –20% by weight of the cookie basecake;

(3) maintaining the temperature of the mixer at a temperature sufficient to ensure that the fat ingredients do not stick to the surface of the mixer;

(4) mixing the ingredients at a speed such that a controlled level of breakage of the cookie basecake pieces will occur and a majority of the pieces will remain intact;

(5) feeding the mixed ingredients into a hopper and subsequently forming the mixed ingredients into a slab using a series of heated compression rolls, which rolls press the mixed ingredients into a progressively thinner slab, and wherein the heat of the rolls is sufficient to prevent adhesion of the fat ingredients on the rolls;

(6) laying the compressed slab of ingredients onto a conveyor belt which feeds the slab through heated slitter knives or a heated grooved roll positioned to slice the slab or form into ropes of a desired width and height;

(7) separating the ropes on a suitable separating conveyor;

(8) cutting the ropes into a desired product length;

(9) cooling the product to ambient temperature, enrobing the individual pieces of product with chocolate or another coating compound; and

(10) packaging the enrobed product in containers suitable for retail sale.

In another embodiment, the invention is directed to a chocolate or compound coated, cold formed, handheld food bar comprised of fragile pieces of a baked cookie basecake product wherein at least about 85% to about 95% by weight of the fragile pieces of cookie basecake are of a size of at least about ¼ inch by ¼ inch, such that the pieces will not pass through a screen with a mesh size of 0.157 inches, and wherein the remainder of the ingredients in the bar comprise sugar and fat, and wherein said sugar is present in an amount ranging from 25%–70% by weight of the cookie basecake, and the fat is present in an amount ranging from 40%–65% by weight of the cookie basecake.

In its basic aspects, the invention is directed to cold formed food bars which contain relatively large pieces of baked cookie pieces which are held together with a fat/sugar mixture and which may contain additional optional ingredients such as puffed wheat, puffed rice, other cereal pieces and nuts. The mixture of ingredients is mixed in a manner which substantially preserves the integrity of the relatively large baked cookie inclusions, gently rolled or otherwise formed into a slab, sliced or otherwise formed into ropes, cut into conveniently sized pieces, generally of a "single-serve" size, enrobed with a coating such as chocolate or a chocolate compound coating and packaged, generally with each single-serve piece separately wrapped.

As a first step large, crunchy baked cookie pieces are required. These cookie pieces should be crisp or crunchy, which requires a degree of hardness, as well as results in a fragile product which must be handled gently to control the extent of breakage of the cookie pieces during further processing procedures, such as mixing and cold forming. For the preparation of the cookie pieces a standard cookie basecake dough may first be prepared using conventional cookie ingredients. The recipe for the cookie basecake is not critical and a variety of suitable recipes may be employed. Those skilled in the art can readily select such a recipe. A typical recipe might include fine grain sugar, high fructose corn syrup, whey, cocoa, salt, lecithin and soda. Minor amounts of vanilla, chocolate liqueur, and ammonium bicarbonate might also be added, and the ingredients mixed with vegetable shortening followed by more mixing and the addition of further flour, followed by more mixing.

The variety of cookie basecake recipes which will provide a cookie basecake product suitable for breaking into the large, fragile cookie pieces which might serve as inclusions in the food bar product of the invention is not limited to any single type of cookie basecake. For example, basecakes similar to those used in sandwich cookies such as Oreo® cookies and basecakes found in common generic variations thereof are quite satisfactory, as are vanilla flavored or other flavored basecakes, such as those found on various commercially available sandwich cookies, such as Cameo® cookies, Nutter Butter® cookies, and the many common generic variations thereof. Another example of a typical formula for a crisp cookie dough is found in Example 1 of Hong, et al. U.S. Pat. No. 4,455,333. Hong, et al. also set forth a quantitative test for determining whether or not a particular baked cookie may be accurately described as "crisp". As used herein, "crisp" is synonymous with "fragile" and "crunchy".

The present invention requires that a dry (2%–3% moisture), fragile, cookie basecake product be prepared and formed into conveniently sized squares or disks which may vary from about 0.1 to 0.2 inches thick, and variations in basecake recipe, as described above, all provide acceptable product for use in connection with the invention.

Cookie shaped discs or squares of basecake dough may be conveniently prepared from mixed raw basecake dough using a conventional rotary molder. At the discharge end of the rotary molder a scoring mechanism can mark score lines on disks of unbaked basecake dough to facilitate breaking disks of baked basecake into conveniently sized pieces. Such a scoring mechanism might comprise two sets of knives for scoring the disks in a cross hatched pattern both across the band and in the direction of product travel. The knives should be adjustable in height so that the depth of cut may be maintained at about 60–80%, preferably about 75% of the thickness of the molded dough. To avoid building up of product on the knives, the knives may be temperature controlled to 100–105° F.

The cookie basecake product is conveniently marked with score lines set such that the product will break into approximately ¼ inch size pieces. The basecake may then be baked in an oven. Upon emerging from the oven, the product should be cooled to permit hardening before being introduced into a basecake breaker. Thus, the product should be hard enough to break against the score lines. The product moisture is conveniently maintained at 2–3%. The basecake breaker might consist of two large diameter rolls mechanically linked together. Such rolls may have a design such as raised pyramids or some other such raised design embossed therein so as to facilitate breakage of the cookie basecake along the score lines. As the scored, baked, basecake product enters the embossed breaker rolls, the product will break along the score lines providing particle sizes as determined by the score lines. The basecake bed height above the breaker rolls is conveniently maintained at a height which prevents jamming of the breaker rolls with broken cookie pieces. After the cookie basecake has been broken into pieces, the pieces may either be transferred to an ingredient mixer for immediate use or may conveniently be stored in a sealed plastic bag or other sealed container while being held for use in manufacturing the cold formed cookie bars.

In lieu of breaking cookie shaped disks to form fragile cookie pieces, other procedures may also be employed. For example, the raw basecake dough may be formed into square, and the squares scored with a waffle design, with the waffling size being chosen to achieve a desired particle size. Cooked basecake dough with waffle design scoring may then be broken into pieces just as are scored disks.

The invention requires relatively large basecake pieces, by which is meant that the score patterns are selected to provide pieces of at least about ⅛ inch by ⅛ inch in size and preferably are scored to provide somewhat larger pieces of about ¼ inch by ¼ inch in size.

When prepared according to the above procedures, the level of fines in the broken cookie pieces, which for purposes of this invention is generally defined as cookie particles less than about 0.157 inches in any given dimension, is generally about 10%–15% based on the total weight of the cookie basecake. Fines are most preferably separated from the larger cookie pieces by use of a screen with a mesh size of 0.157 inch plus or minus 10%. However, after screening the large cookie pieces will still contain fines in an amount of about 8% by weight based on the total weight of the basecake pieces, since approximately that level of fines will adhere to the surfaces of the larger pieces of broken basecake. A somewhat larger amount of fines than this 8% level is generally preferred for the cookie bars of the instant invention, as the fines contribute to the cohesiveness of the bar product. Thus, in addition to the larger pieces of basecake which do not pass through the screens a 0.157 inch, or other selected mesh size, and the fines found thereon further fines are added to the bar ingredients, such that the total level of fines will rise to a predetermined level chosen to improve adhesiveness. The amount of such added fines may range up to about 15% based on the total weight of the large pieces of broken basecake. The addition of fines in the range of 6%–9% based on the total weight of the layer basecake pieces is preferred. As additional fines are added to the food bar product, the density of the final bar product increases. Thus, in order to make a lighter bar product, the amount of fines is limited, whereas a denser bar product may be prepared by increasing the level of fines.

Next, a binding paste must be prepared. Various binding pastes are acceptable. Recipes for such binding pastes, based primarily on sugar, filler fat and coating fat, would typically consist of:

| | |
|---|---|
| 6x sugars | 52%–56% |
| filler fat | 30%–35% |
| lecithin | 0–1% |
| salt | 0–1% |
| flavor | 0–2% |
| coating fat | 10%–13% |

The sugar used in the binding paste is preferably a powdered or confectioners sugar. Suitable filler fats and coating fats include the wide variety of such fats which are commercially available. The term "filler fat" as used here is synonymous with "filling fat" and as used here has the meaning generally understood in the art—that is an oleaginous composition which is soft and spreadable at room temperature. A "coating fat" as used herein also has the meaning generally understood in the art—that is a hard, oleaginous material which at room temperature preferably breaks with a snap and which melts sharply at or about body temperature, thus contributing to a mouthfeel associated with cocoa butter.

As will be appreciated by those skilled in the art, various other fat blends would achieve the same functionality in a binder paste as the above described paste which contains ratios of filler fat to coating fat in the range from about 2.5:1 to 3.5:1. The important factor in selecting a fat or fats for use in the binding paste is to select a fat or fats which will offer similar cohesiveness and mouthfeel as do the fat blends utilized in the above binding paste recipe As is known and understood in the art, fats are characterized by indices which describe the percent of the fat which will remain solid at particular temperatures. See, for example, Wheeler, et al. U.S. Pat. No. 5,378,490, incorporated herein by reference, in which are found figures depicting the melt characterized of various fats. By considering such melt characteristics, those skilled in the art could utilize a variety of fat blends to achieve the characteristics demonstrated by the filler fat coating fat blend described above, i.e. a cohesive cold formed bar could be prepared with the bar having a desirable fat mouthfeel in that the product would have a clean taste without leaving either an oily or waxy aftertaste.

The binding paste after mixing may be conveniently stored in an agitated, jacketed tank at a temperature sufficient to keep the fat in a state suitable for easy mixing, which for the recipe set forth above would be about 140° F.

Food bar products according to the invention may then be prepared using the binding paste and cookie pieces. The total amount of cookie basecake, including both fines and pieces, should generally be in the range of from 45%–57% by weight of the unenrobed food bar product. Binding paste in an amount of from 40%–50% by weight of the unenrobed cookie basecake may then be mixed with the cookie basecake along with any other desired inclusions such as nuts, puffed wheat, puffed rice or other compatible inclusions. Such other inclusions may range from 0–15% or more by weight of the unenrobed food bar product. The blender in which the ingredients is mixed is typically heated, thus preventing the filler fat from adhering to the surfaces of the blender. To achieve proper mixing and wetting of the dry ingredients within the binder, and to minimize and thereby control the level of breakage of fragile cookie basecake pieces, a set of baffles may be fit on a screw shaft in the blender and gentle mixing accomplished by a "folding over" action as the screw shaft rotates at a slow speed, perhaps approximately 3–4 RPM. Under such mixing conditions, a majority of fragile cookie pieces in the mix will remain intact. The ingredients may be metered using a mass flow system. Using such a system, a mixed dough ultimately will on a production line with a speed which might, depending on the arrangement and types of apparatus employed, conveniently be in a range of 4–5 ft/minute, although much faster speeds may be achieved.

The mixed dough material may then be fed into a hopper in which initial steps directed to formation of the cold formed product into a conveniently handled form takes place. For example, a spoked wheel may agitate and feed the material into a lightly corrugated smooth roll, along with a corresponding spoked wheel. Next the material may be fed to a smaller spoke/kibbler, and the material laid down in a uniform manner onto a conveyer belt. A set of paddles may serve to level the mixed ingredient mass prior to entry of the mass into heated compression rolls. A series of two or more jacketed/heated compression rolls may be employed and the gaps set sequentially such that controlled compression may be applied in order to preselect whether the resulting product will be light and airy texture or denser product, and to minimize breakage of the fragile baked inclusions, yet still provide sufficient pressure to form a slab.

The temperature of product emerging from the compression rolls is conveniently kept warm, perhaps at between 105°–110° F., thus keeping the ingredient mix pliable. The target dough piece weight must also be selected. Based on this target dough piece weight, the dough throughput rate may be calculated. The product can then be slit into rope in a temperature controlled environment, Teflon impregnating coating and anodized rolls, which are heated to prevent adhesive by the coating fat, permit easy release and minimize deformation of the product. After moving through heated slitter knives or a heated forming roll, the rows/ropes may be introduced onto a separating conveyor so that the rows/ropes may be separated with minimal product deformation. A heated guillotine may be used to cut the ropes to a predetermined length, whereupon the pieces may be sent to a cooling tunnel. The guillotine, when cutting product to proper length, will typically use a single stroke and at the end of the stroke move in the direction of product travel slightly to provide product separation.

The next step in the process is to cool the cut product to a temperature that will allow the product to set, prior to an enrobing step. A conventional enrober may be used to apply chocolate or chocolate compound coating.

Finally the product may be collected and transported to a packaging area.

The following example is presented to further illustrate and explain the invention and is not intended to be limiting in any regard. Unless otherwise indicated, all parts and percentages are by weight.

EXAMPLE

A candy cookie product according to the invention was prepared as follows:

As a first step baked cookie pieces were prepared. For this preparation, a standard cookie basecake dough was mixed in an upright mixer using conventional cookie ingredients, including fine grain sugar, high fructose corn syrup, whey, cocoa, salt, lecithin and soda. Minor amounts of vanilla, chocolate liqueur, and ammonium bicarbonate were also added. After mixing at a low speed, liquid vegetable shortening was added, followed by one more minute of mixing and then the addition further of flour, followed by 10 more minutes of mixing. When the mixing was complete, the basecake dough was formed into cookies approximately 1 inch in diameter and 0.115 inches thick using a rotary molder and discharged onto an oven band.

At the discharge end of the rotary molder, a scoring mechanism consisting of two sets of knives scored the product in a cross hatched pattern both across the band and in the direction of product travel. The knives were adjustable in height so that the depth of cut was consistently maintained at 75% of the thickness of the molded dough. To avoid building up of product on the knives, the knives were temperature controlled to 100°–105° F.

The cookie basecake product was scored with score lines set such that the product would break into approximately ¼ inch size pieces. The basecake was then baked in an oven at a bake time of 3:30 minutes. Upon emerging from the oven, the product was cooled to between 75°–80° F. before being introduced into a basecake breaker. Thus, the product was hard enough to break against the score lines. The product moisture was maintained at 2.25%. The breaker consisted of two large diameter rolls, with a raised pyramid design embossed thereon. The rolls were mechanically linked together. As the product entered the breaker rolls, the product broke along the score lines providing primarily particle sizes of approximately ¼ inch. The basecake bed height above the breaker rolls was maintained at between 1–2 inches, thus preventing jamming of the breaker rolls with broken cookie pieces. After the cookie basecake had been broken into pieces, the pieces were ¼ inch pieces were separated from fines by screening through a 0.157 inch mesh screen. The pieces were placed in a plastic bag and sealed while being held for use in cold formed cookie bars. This product of ¼ inch pieces contained about 8% fines, which were adhered to the surfaces of the larger broken pieces of basecake.

Next, a binding paste was prepared according to the following formula:

| | |
|---|---|
| 6× sugars | 50 pounds |
| filler fat | 30 pounds |
| lecithin | .3 pounds |
| salt | .4 pounds |
| vanilla | .2 pounds |
| coating fat | 11 pounds |

The binding paste, after mixing, was stored in an agitated, jacketed tank at a temperature of 140° F.

The food bar product was then prepared using the binding paste and cookie pieces. Additional cookie basecake fines were also added in order to help achieve a cohesive bar product. For the preparation of this example, the full batch of the above prepared binding paste, together with 100 pounds of the broken basecake and 5 pounds of puffed wheat were mixed in a heated jacketed screw blender consisting of a 22-inch diameter semi-open helical screw configuration with an overall length of 10 feet. The blender was heated to 140° F. thus preventing the filler fat from adhering to the surfaces of the blender. To achieve the proper mixing and wetting of the dry ingredients with the binder, and to minimize breakage of the dry ingredients, a set of baffles was fit on the screw shaft and mixing was accomplished by a "folding over" action as the screw feeder rotated at approximately 3–4 RPM. The ingredients were metered into the screw feeder using a mass flow system for the 140° F. binder, which was fed at a rate of 13.1 lbs/min.—mixed along with the basecake and puffed wheat which were fed using Weigh Belt feeders at rates of 16.1 lbs/min. and 1.4 lbs/min. respectively. Using such a system, a mixed dough ultimately exited on a production line with a speed of 4–5 ft/minute.

The dough material was then fed into a hopper where a spoked wheel agitated and fed the material into a lightly corrugated smooth roll, along with a corresponding spoked wheel. Next the material was fed to a smaller spoke/kibbler, and the material laid down in a uniform manner onto a conveyer belt. A set of paddles leveled the mass prior to entry of the mass into heated compression rolls. Three heated (105° F.–110° F.) compression rolls were employed and the gaps were set sequentially to 1⅛ inch, ⅝ inch and 7/16 inch. Minimum compression was applied in order to maintain the light and airy texture of the product, and to control the extent of breakage of the fragile baked inclusions.

The next step was to form the dough into 16 inch slabs using 3 six inch diameter heated compression rolls. The temperature of product emerging from the compression rolls was maintained at between 105°–110° F. The target dough piece weight was 16 grams±1 gram. The product was slit into ⅝ inch wide rope in a temperature controlled environment of between about 105°–110° F. After moving through a heated slitter or heated forming roll, the rows/ropes were introduced onto a Martens separating conveyor so that the rows/ropes could be separated to a ½ inch wide spacing with minimal product deformation. A heated guillotine was used to cut the ropes to a 3.5 inch length whereupon the pieces were sent to a cooling tunnel. The guillotine, when cutting product to proper length, used a single stroke and at the end of the stroke moved in the direction of product travel slightly to provide product separation.

The next step in the process was to gently convey the product so that it could be cooled to a temperature that would allow the product to set. Temperatures entering a cooling tunnel ranged between 100°–105° F. The cooling tunnel was a 20-foot Sollich Tunnel using forced air with a temperature of 40°–45° F. The actual cooling tunnel air chamber temperature was 46°–50° F. The target temperature for bar pieces exiting the tunnel was 75°–80° F. The cooling time required to cool the product to 75° F. was 4.2 minutes under these particular process conditions.

The next step in the process was to enrobe the product with compound chocolate at 105° F. A Sollich Enrober (Model: TTS-320) was used to apply compound coating. The compound coating was a conventional chocolate compound coating. Finally, the product was transferred to a second 20-foot Sollich Cooling Tunnel (Model MK 280) to set the compound chocolate at 75° F.–80° F. prior to packaging.

The product was collected in trays and then hand fed to a Doboy Horizontal Wrapper-Mustang IV (SN: 94-17141) utilizing metallized film.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method for cold forming food bars containing large fragile particles of a crisp baked cookie product comprising: (1) breaking a crisp cookie basecake into pieces of a preselected size; (2) mixing the basecake pieces in a mixer with ingredients comprising sugar, filler fat, and coating fat, wherein the sugar is present in an amount ranging from 25%–70% by weight of the cookie basecake, the filler fat is present in an amount ranging from 15%–35% by weight of the cookie basecake, and the coating fat is present in an amount ranging from about 5%–20% by weight of the cookie basecake; (3) maintaining the temperature of the mixer at a temperature sufficient to ensure that the fat ingredients do not stick to the surface of the mixer; (4) mixing the ingredients at a speed such that a majority of the cookie basecake particles of the preselected size will remain intact; (5) feeding the mixed ingredients into a hopper and subsequently forming the mixed ingredients into a slab using a series of heated compression rolls, which rolls press the mixed ingredients into a progressively thinner slab while minimizing breakage of the crisp baked cookie pieces, and wherein the heat of the rolls is sufficient to prevent adhesion of the fat ingredients on the rolls; (6) laying the compressed slab of ingredients onto a conveyor belt which feeds the slab through heated slitter knives or a heated grooved roll positioned to slice or form the slab into ropes of a desired width and height; (7) separating the ropes on a conveyor; (8) cutting the ropes into a desired product length; (9) cooling the product to ambient temperature, enrobing the individual pieces in chocolate or another coating compound; and (10) packaging the enrobed product in containers suitable for retail sale.

2. The method of claim 1 wherein the cookie basecake is a cocoa flavored basecake.

3. The method of claim 1 wherein the food bar product is a individually wrapped single serve product.

4. The method of claim 1 wherein the ingredients in the mix includes up to 10% by weight, based on the total weight of the mixture, of one or more ingredients selected from the group consisting of nuts and cereal pieces.

5. The method of claim 4 wherein the cereal pieces are selected from the group consisting of puffed rice and puffed wheat.

6. A method for cold forming enrobed food bars containing large fragile particles of a crisp baked cookie product comprising: (1) breaking a crisp cookie basecake into pieces at least 85% by weight of which are of a size which will not pass through a screen with a mesh size of 0.157 inches; (2) mixing cookie basecake, consisting of the said basecake pieces along with basecake fines in an amount such that the cookie basecake pieces plus fines will account for 48%–56% by weight of the cold formed bar prior to enrobing, and wherein said cookie basecake consists of 10%–15% by weight of fines, in a mixer with ingredients comprising a preblended mixture of sugar, a filler fat, and a coating fat, and optional inclusions such as cereal pieces, nuts or other compatible inclusions, wherein the added sugar is present in an amount ranging from 25%–70% by weight of the cookie basecake, the filler fat is present in an amount ranging from 15%–35% by weight of the cookie basecake, and the coating fat is present in an amount ranging from about 5%–20% by weight of the cooked basecake; (3) maintaining the temperature of the mixer at a temperature sufficient to ensure that the fat ingredients do not stick to the surface of the mixer; (4) mixing the ingredients at a speed such that a controlled level of breakage of the cookie basecake pieces will occur and a majority of the pieces will remain intact; (5) feeding the mixed ingredients into a hopper and subsequently forming the mixed ingredients into a slab using a series of heated compression rolls, which rolls press the mixed ingredients into a progressively thinner slab while minimizing breakage of the crisp baked cookie pieces, and wherein the heat of the rolls is sufficient to prevent adhesion of the fat ingredients on the rolls; (6) laying the compressed slab of ingredients onto a conveyor belt which feeds the slab through heated slitter knives or a heated grooved roll positioned to slice or form the slab into ropes of a desired width and height; (7) separating the ropes on a suitable separating conveyor; (8) cutting the ropes into a desired product length; (9) cooling the product to ambient temperature, enrobing the individual pieces of product with chocolate or another coating compound; and (10) packaging the enrobed product in containers suitable for retail sale.

7. The method of claim 6 wherein the cookie basecake is a cocoa flavored basecake.

8. The method of claim 6 wherein the food bar product is a individually wrapped single serve product.

9. The method of claim 6 wherein the ingredients in the mixes include up to 10% by weight, based on the total weight of the mixture, of one or more ingredients selected from the group consisting of nuts and cereal pieces.

10. The method of claim 7 wherein the cereal pieces are selected from the group consisting of puffed rice and puffed wheat.

* * * * *